(12) United States Patent
Call

(10) Patent No.: US 8,371,265 B1
(45) Date of Patent: Feb. 12, 2013

(54) AUTOMOBILE EMERGENCY STOP SYSTEM

(76) Inventor: Stephen Call, Petersburg, MI (US)

( * ) Notice: Subject to any disclaimer, the term of this patent is extended or adjusted under 35 U.S.C. 154(b) by 203 days.

(21) Appl. No.: 12/897,844

(22) Filed: Oct. 5, 2010

(51) Int. Cl.
F02M 63/02 (2006.01)

(52) U.S. Cl. .................. 123/332; 123/333; 123/198 DB; 200/15; 200/48 KB; 200/554; 200/254; 200/270

(58) Field of Classification Search .................. 123/320, 123/332, 198 C, 198 B, 198 DB, 198 DC, 123/198 D, 333; 200/6 R, 554, 563, 522, 200/555, 15, 16 F, 16 R, 48 KB, 243, 254, 200/270–272
See application file for complete search history.

(56) References Cited

U.S. PATENT DOCUMENTS

| 368,221 | A | * | 8/1887 | McDaniel | 200/2 |
| 502,519 | A | * | 8/1893 | Hoffmann | 200/554 |
| 1,673,385 | A | * | 6/1928 | Wurdack | 200/557 |
| 1,854,868 | A | | 4/1932 | Talkes et al. | |
| 2,243,741 | A | * | 5/1941 | Rowe | 439/833 |
| 2,337,791 | A | * | 12/1943 | Wurdack, Jr. | 200/563 |
| 3,623,569 | A | * | 11/1971 | Wilkins | 180/287 |
| 4,295,540 | A | * | 10/1981 | Hildebrecht | 180/271 |
| 4,352,404 | A | * | 10/1982 | Stier | 180/179 |
| 4,414,937 | A | | 11/1983 | Ueda et al. | |
| 4,691,801 | A | | 9/1987 | Mann et al. | |
| 5,219,413 | A | | 6/1993 | Lineberger | |
| 5,469,298 | A | * | 11/1995 | Suman et al. | 359/630 |

* cited by examiner

Primary Examiner — Rinaldi Rada
Assistant Examiner — Kevin Lathers
(74) Attorney, Agent, or Firm — Kyle Fletcher

(57) ABSTRACT

The automobile emergency stop system includes a knife switch that is wired to one of the wires running to a fuel pump of a vehicle. The system is designed for use with a parking brake such that upon breaking the circuit, electrical flow to the fuel pump ceases and the engine stops. The system is designed to close the circuit when the parking brake is not lifted. The system is adapted for all types of parking brakes, and includes hand actuated or foot actuated parking brakes. The system is designed for use as an anti-theft measure as well as a safety measure for a computer controlled engine that faults and accelerates out of control.

6 Claims, 4 Drawing Sheets

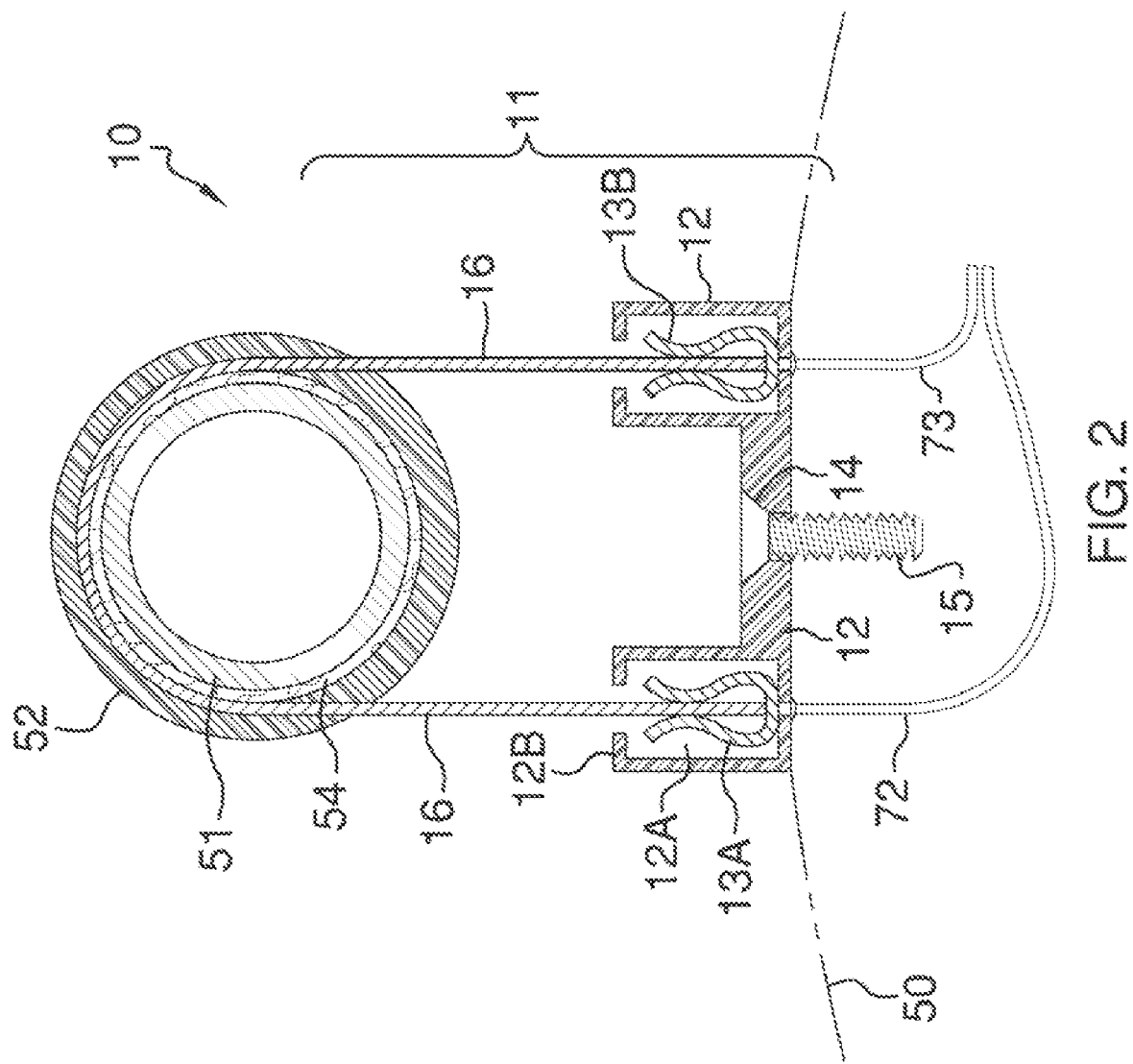

AUTOMOBILE EMERGENCY STOP SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of devices that aid in stopping a vehicle, more specifically, a device that forms an additional wiring circuit with a fuel pump.

B. Discussion of the Prior Art

As a preliminary note, it should be stated that there is an ample amount of prior art that deals with emergency stop systems for a vehicle. As will be discussed immediately below, no prior art discloses a knife switch that is mounted to a parking brake and of which forms an electrical circuit to a fuel pump of a vehicle and upon which can disrupt electrical current flowing to the fuel pump and of which will cause the engine of the vehicle to stall.

The Hildebrecht Patent (U.S. Pat. No. 4,295,540) discloses a vehicle brake and engine interlock system, wherein when the parking brake is activated, the system overrides the operator's control to limit fuel intput to the engine. However, the system does not simply open a circuit that shuts off electrical current to the fuel pump of a vehicle, which ultimately stalls the engine.

The Talkes Patent (U.S. Pat. No. 1,854,868) discloses a device for automatically stopping the motor of an automobile. However, the device works with the ignition switch to turn on/off the engine as opposed to turning on/off the fuel pump, which essentially starves the engine of fuel.

The Lineberger Patent (U.S. Pat. No. 5,219,413) discloses an engine idle shit-down controller for a vehicle that includes a parking brake activated switch. However, the switch does not open a circuit that stops electrical current from entering the fuel pump of an engine, and ultimately stalling the engine.

The Mann et al. Patent (U.S. Pat. No. 4,691,801) discloses an anti-theft system for vehicles that interrupt the fuel supply when activating the vehicle's parking brake system. Again, the system is not designed to simply open or close a circuit that supplies electricity to the fuel pump for use in ceasing fuel supply to the engine and thereby stalling the engine in due course, and for use during operation of the vehicle and not as anti-theft system.

The Ueda et al. Patent (U.S. Pat. No. 4,414,937) discloses an automatic engine stop and start apparatus. However, the apparatus requires a plurality of inputs to appear before issuing an alarm, and does not simply stop the electrical current to a fuel pump.

While the above-described devices fulfill their respective and particular objects and requirements, they do not describe a knife switch that is mounted to a parking brake and of which forms an electrical circuit to a fuel pump of a vehicle and upon which can disrupt electrical current flowing to the fuel pump and of which will cause the engine of the vehicle to stall. In this regard, the automobile emergency stop system departs from the conventional concepts and designs of the prior art.

SUMMARY OF THE INVENTION

The automobile emergency stop system includes a knife switch that is wired to one of the wires running to a fuel pump of a vehicle. The system is designed for use with a parking brake such that upon breaking the circuit, electrical flow to the fuel pump ceases and the engine stops. The system is designed to close the circuit when the parking brake is not lifted. The system is adapted for all types of parking brakes, and includes hand actuated or foot actuated parking brakes. The system is designed for use as an anti-theft measure as well as a safety measure for a computer controlled engine that faults and accelerates out of control.

It is an object of the invention to provide a switch that is wired to one of the powering wires of a fuel pump of a vehicle such that upon breaking a circuit formed therein, all electrical current to the fuel pump ceases, which stop an engine.

A further object of the invention is to provide a knife switch that closes the circuit when the parking brake is not activated, and thus enables the electrical current to flow to the fuel pump uninhibited.

A further object of the invention is to provide a knife switch that operates on any type of parking brake.

A further object of the invention is to provide a knife switch for use with either a hand operated or foot operated parking brake.

A further object of the invention is to provide an emergency stop system that can turn off an engine by depriving the engine of fuel, and of which can override all computer systems.

A further object of the invention is to provide an emergency stop system that is simplistic, highly affordable, effective, and easy to install and use.

A further object of the invention is to include a label on the parking brake that reminds the driver of the invention when he or she gets into the vehicle.

These together with additional objects, features and advantages of the automobile emergency stop system will be readily apparent to those of ordinary skill in the art upon reading the following detailed description of presently preferred, but nonetheless illustrative, embodiments of the automobile emergency stop system when taken in conjunction with the accompanying drawings.

In this respect, before explaining the current embodiments of the automobile emergency stop system in detail, it is to be understood that the automobile emergency stop system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the automobile emergency stop system.

It is therefore important that the claims be regarded as including such equivalent construction insofar as they do not depart from the spirit and scope of the automobile emergency stop system. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 2 illustrates a cross-sectional view of the automobile emergency stop system along line 2-2 in FIG. 1 and detailing the U-shaped copper contacts touching the knife switch to form the circuit thus allowing electrical power to the fuel pump;

DETAILED DESCRIPTION OF THE EMBODIMENT

Figure 1:
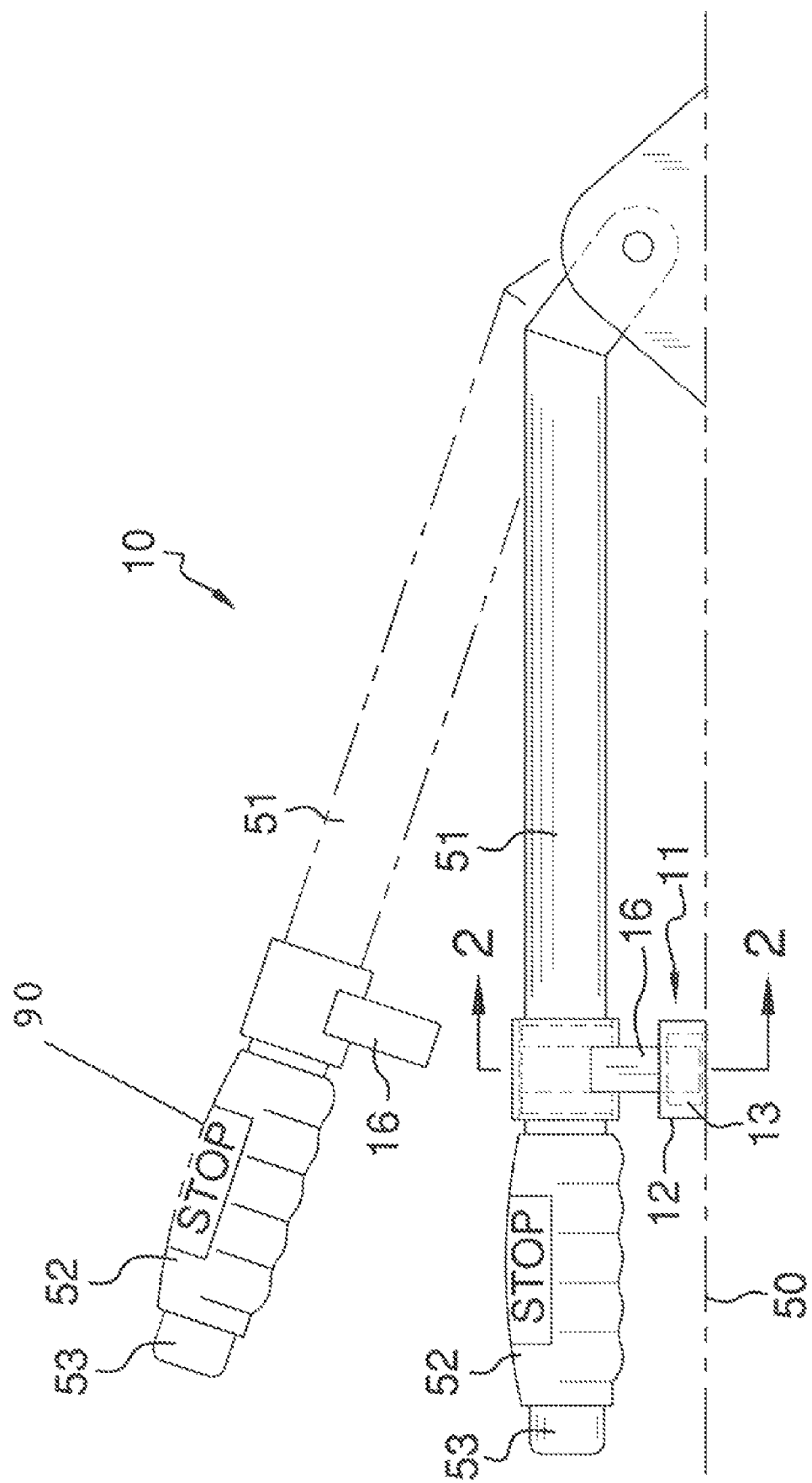
FIG. 1 illustrates a side view of the automobile emergency stop system installed on a parking brake and depicting a raised position of the parking brake that illustrates opening of the knife switch, and includes a "STOP" label to remind the driver of the invention.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-5. An automobile emergency stop system 10 (hereinafter invention) includes a knife switch 11.

The knife switch has a base 12 in which are two receivers 13. The base 12 has a hole 14 through which a bolt 15 is inserted in order to secure the base 12 to a floor 50 or lever 51.

The base 12 has cavities 12A formed by L-shaped sides 12B that surround a majority of the receivers 13. A U-shaped contact 16 is attached to a lever 51. The U-shaped contact 16 connects with the receivers 13 to form a closed circuit as depicted in FIG. 2.

Figure 4:
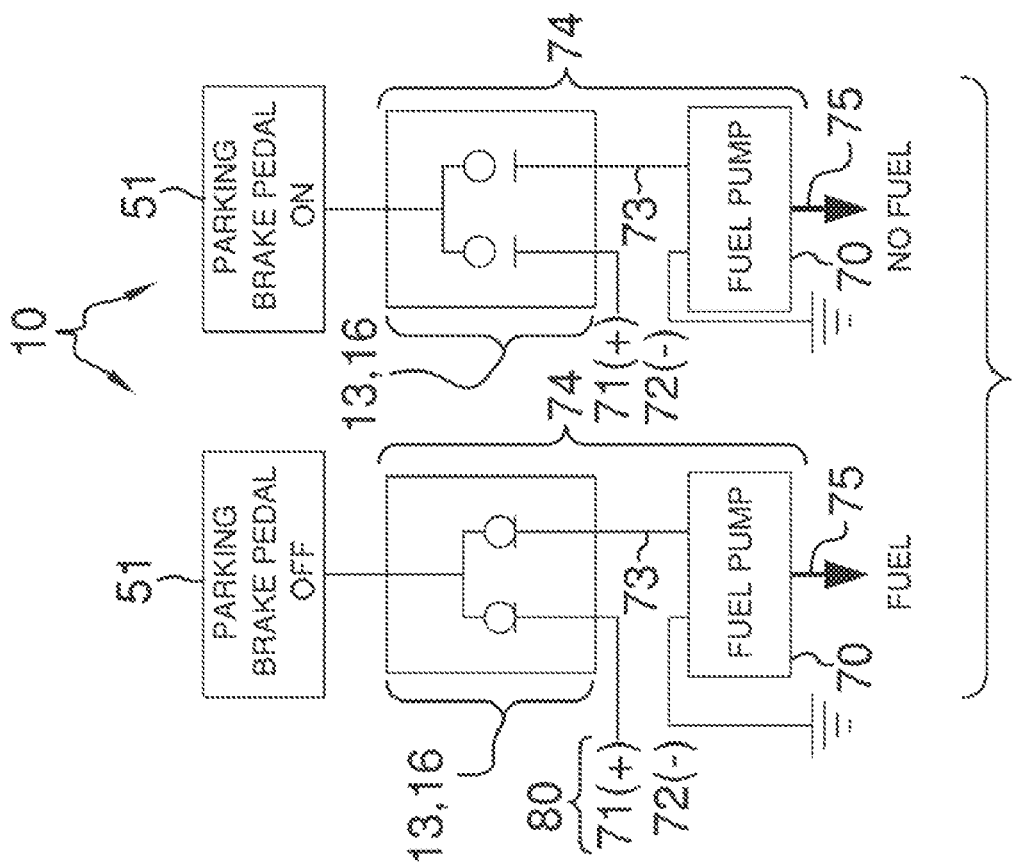
FIG. 4 illustrates an electrical diagram of the automobile emergency stop system in use with a hand operated parking brake lever as detailed in FIGS. 1 and 2, and detailing the circuit in a closed state and an open state.
Figure 5:
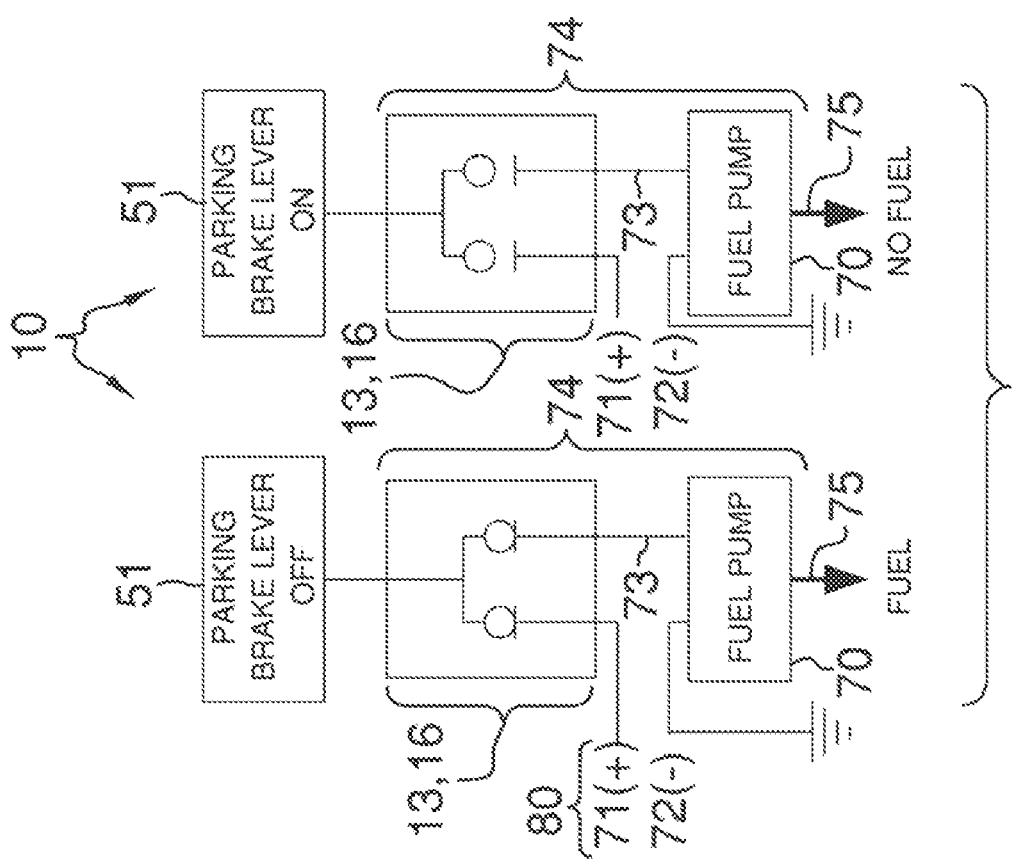
FIG. 5 illustrates an electrical diagram of the automobile emergency stop system in use with a foot operated parking brake lever as depicted in FIGS. 3A and 3B, and detailing the circuit in a closed state and an open state.

Referring to FIGS. 2 and 4-5, A fuel pump 70 has a plus (+) wire 71 and a negative (−) wire 72 that provides electrical current to the fuel pump 70 thus powering said fuel pump 70, which delivers fuel to an engine. The plus (+) wire 71 and the negative (−) wire 72 are wired to a vehicle electrical supply 80.

The plus (+) wire 71 has a voltage greater than the negative (−) wire 72, which creates a difference forming an electrical current having a voltage specified by the difference between the two wires. Thus, electrical current travels from the plus (+) wire 71 across the fuel pump 70 in lieu of the negative (−) wire 72.

That being said, the invention 10 is wired in-line with either the plus (+) wire 71 or the negative (−) wire 72 in order to form a circuit that can be open closed upon actuation of the parking brake. However, it shall be noted that the invention 10 is ideally suited for use on the plus (+) wire 71.

A first receiver 13A of the knife switch 11 is wired to the plus (+) wire 71 coming from an electrical distributor (not shown). A second receiver 13B of the knife switch 11 is wired to a second wire 73 that is wiredly connected to the fuel pump 70.

Simply put, when the U-shaped contact 16 is engaged in both the first receiver 13A and the second receiver 13B, electrical current can pass across a circuit 74 formed via the plus (+) wire 71, the negative (−) wire 72, second wire 73, and the fuel pump 70. Thus, the fuel pump 70 receives an electrical supply or an electrical current, which enables the fuel pump 70 to supply an engine with fuel via a fuel line 75, which is necessary to operate.

Once, the U-shaped contact 16 is disengaged from either or both the first receiver 13A and the second receiver 13B, electrical current cannot pass across the circuit 74 formed via the plus (+) wire 71, the negative (−) wire 72, the second wire 73, and the fuel pump 70. Thus, the fuel pump 70 does not receive the electrical supply or the electrical current needed to operate, and the engine will stall.

Referring to FIG. 2, the invention 10 is suited for use with a hand-operated parking brake that is defined by the lever 51 rotating up and down to open and close the circuit 74 defined above. The lever 51 has a handle 52 with a spring-loaded button 53 that releases the lever 51 from a locked position (up state). The handle 52, button 53, and lever 51 are well known in the art. Upon raising the lever 51 to apply the parking brake, the circuit 74 is opened, and the electrical current to the fuel pump 70 is interrupted, and thus no new fuel is being supplied to an engine via the fuel line 75. Upon lowering the lever 51 to disengage the parking brake, the circuit 74 is closed, and the electrical current to the fuel pump 70 is restored. Now, the fuel pump 70 may be powered to supply fuel to the engine via the fuel line 75.

It shall be noted that a layer of insulation 54 may be included, as depicted in FIG. 2, and used to insulate the U-shaped contact 16 with respect to a grounding voltage of the lever 51 or by being touched by an end user. The inclusion of the insulation 54 insures that the circuit 74 is able to perform as intended, and is not compromised via being in electrical contact with other ground voltages associated with the end user or the lever 51.

It shall be noted that the insulation 54 is wrapped around the lever 51 and is sandwiched between the lever 51 and the U-shaped contact 16 for at least 180 degrees around the lever 51 or where the lever 51 would otherwise come into contact with the U-shaped contact 16.

Figure 3A:
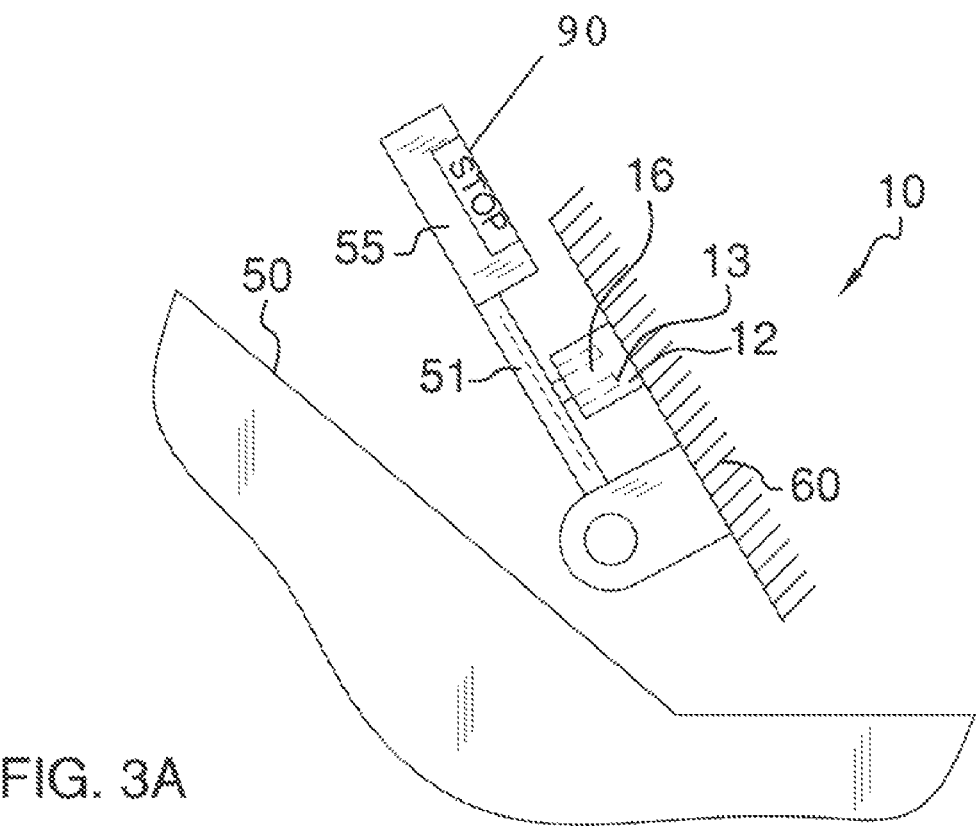
FIG. 3A illustrates a side view of the parking brake pedal mounted to a vehicle floor wherein the knife switch is mounted above the brake pedal such that when the brake pedal is released, the circuit is formed with the knife switch.
Figure 3B:
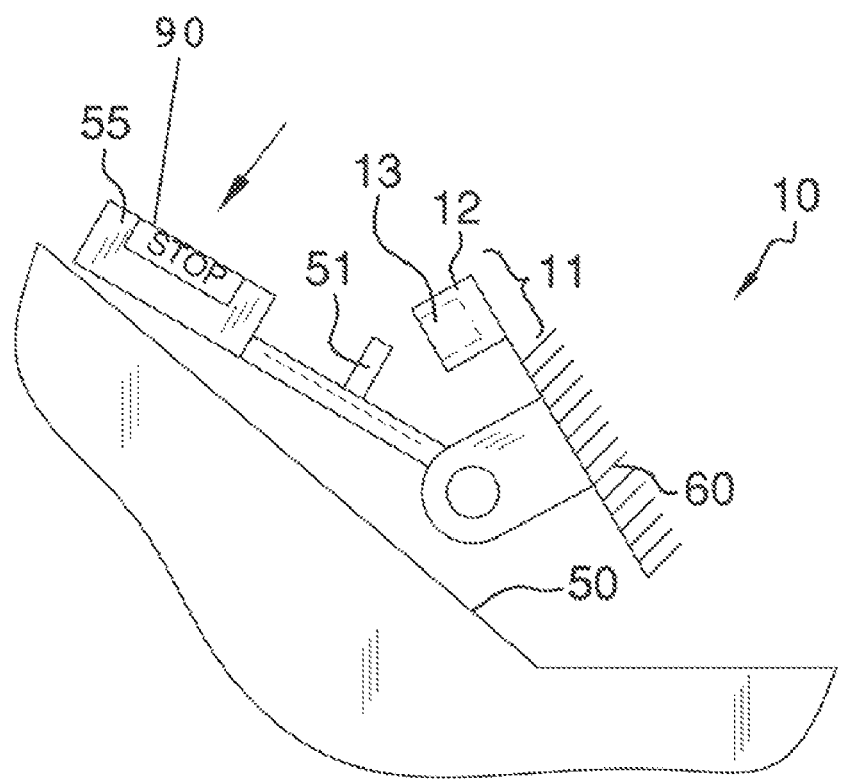
FIG. 3B illustrates a side view of the parking brake of the type depicted in FIG. 3A wherein the brake pedal is being used and of which the knife switch is disconnected with the U-shaped contact members thus severing the electrical circuit.

Referring to FIGS. 3A-3B, the lever 51 has a foot pedal 55 that is engaged by a foot of an end user (not shown) to actuate the parking brake. Upon engaging the parking brake, the circuit 74 is opened, and the electrical current to the fuel pump 70 is interrupted (see FIG. 3B). Upon release of the parking brake, the circuit 74 is closed, and the electrical current to the fuel pump 70 is restored (see FIG. 3A).

It shall be noted that the base 12 and the receivers 13 of the knife switch 11 are located at an elevated position above the lever 51. The location of the knife switch 11 may require the base 12 and the bolt 15 to be attached to an interior surface 60 that may be on an interior, side of the vehicle. More particularly, the interior surface 60 is adjacent the location of the lever 51. Additionally, the interior surface 60 may be referred to as the floor.

It shall be further noted that the invention 10 is a fail-safe system such that if anything goes awry with the invention 10, the vehicle will not run.

It shall be noted that when fuel pump 70 is not powered, the lack of fuel going into the engine, will act as a brake effect in that the compression of the engine will cause the vehicle to stop.

Referring to FIGS. 1, 3A, and 3B the invention 10 includes a label 90 that acts as a reminder to the end user of the invention 10. In FIGS. 3A and 3B, the label 90 is on the foot pedal 55; whereas in FIG. 1, the label 90 is on the handle 52.

With respect to the above description, it is to be realized that the optimum dimensional relationship for the various components of the invention 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. An automobile emergency stop system, further comprising:
   a knife switch is mounted to a floor adjacent a lever of a parking brake;
   wherein a U-shaped contact attaches to the lever and engages receivers located in the knife switch;
   wherein the receivers are wired between a positive wire coming from a vehicle electrical supply and a second wire attaching to a fuel pump;
   wherein electrical current to the fuel pump is interrupted or restored depending upon the interplay of the U-shaped contact and the receivers such that fuel to a fuel line is cut off or maintained;
   wherein the knife switch includes a base, and a label that is a reminder of the presence of the system to an end user;
   wherein the base includes L-shaped sides that form cavities around the receivers;
   wherein the base includes a hole for a bolt to secure the base to a floor;
   wherein the U-shaped contact wraps around the lever; and
   wherein a layer of insulation is wrapped around the lever, and is sandwiched between the lever and the U-shaped contact.

2. The automobile emergency stop system as described in claim 1 wherein a negative wire is wired to the fuel pump; wherein a circuit is formed with the positive wire, the negative wire, the receivers, the U-shaped contact, and the second wire.

3. The automobile emergency stop system as described in claim 2 wherein upon applying the parking brake, the circuit is opened and the electrical current to the fuel pump is interrupted; wherein upon disengaging the parking brake, the circuit is closed and the electrical current to the fuel pump is restored.

4. An automobile emergency stop system, further comprising:
   a knife switch is mounted to a floor adjacent a lever of a parking brake;
   wherein the knife switch includes a base;
   wherein a U-shaped contact attaches to the lever and I engages receivers located in the knife switch;
   wherein the receivers are wired between a wire coming from a vehicle electrical supply and a second wire attaching to a fuel pump;
   wherein electrical current to the fuel pump is interrupted or restored depending upon the interplay of the U-shaped contact and the receivers such that fuel to a fuel line is cut off or maintained;
   wherein the wire and the second wire are either a positive wire or a negative wire in between the vehicle electrical supply and the fuel pump;
   wherein the base includes L-shaped sides that form cavities around the receivers;
   wherein the U-shaped contact wraps around the lever, and a label is included and is a reminder of the presence of the system to an end user;
   wherein a layer of insulation is wrapped around the lever, and is sandwiched between the lever and the U-shaped contact;
   wherein the U-shaped contact is mounted on a lever of a hand-operated parking brake or a foot-operated parking brake;
   wherein the base of the knife switch is bolted to the floor adjacent the lever;
   wherein a circuit is located and wired between the vehicle electrical supply and the fuel pump;
   wherein the circuit is formed via a negative wire, a second wire, a positive wire, the receivers, and a the U-shaped contact;
   wherein upon applying the parking brake, the circuit is opened and the electrical current to the fuel pump is interrupted; and
   wherein upon disengaging the parking brake, the circuit is closed and the electrical current to the fuel pump is restored.

5. The automobile emergency stop system as described in claim 4 wherein the base includes a hole for a bolt to secure the base to the floor, and a label included and is a reminder of the presence of the system to an end user.

6. An automobile emergency stop system, further comprising:
   a knife switch is mounted to a floor adjacent a lever of a parking brake;
   wherein the knife switch includes a base;
   wherein a label is included and is a reminder of the presence of the system to an end user;
   wherein a U-shaped contact attaches to the lever and engages receivers located in the knife switch;
   I wherein the receivers are wired between a negative wire coming from a vehicle electrical supply and a second wire attaching to a fuel pump;
   wherein electrical current to the fuel pump is interrupted or restored depending upon the interplay of the U-shaped contact and the receivers such that fuel to a fuel line is cut off or maintained;

wherein the U-shaped contact is mounted on a lever of a hand-operated parking brake or a foot-operated parking brake; wherein the base of the knife switch is bolted to the floor adjacent the lever; wherein a circuit is located and wired between the vehicle electrical supply and the fuel pump; wherein the circuit is formed via a negative wire, a second wire, a positive wire, the receivers, and the U-shaped contact;

wherein upon applying the parking brake, the circuit is opened and the electrical current to the fuel pump is interrupted; wherein upon disengaging the parking brake, the circuit is closed and the electrical current to the fuel pump is restored;

wherein the base includes L-shaped sides that form cavities around the receivers;

wherein the base includes a hole for a bolt to secure the base to the floor;

wherein the U-shaped contact wraps around the lever; and wherein a layer of insulation is wrapped around the lever, and is sandwiched between the lever and the U-shaped contact.

* * * * *